June 12, 1962  C. H. COLVIN  3,038,339
PRESSURE TRANSDUCER

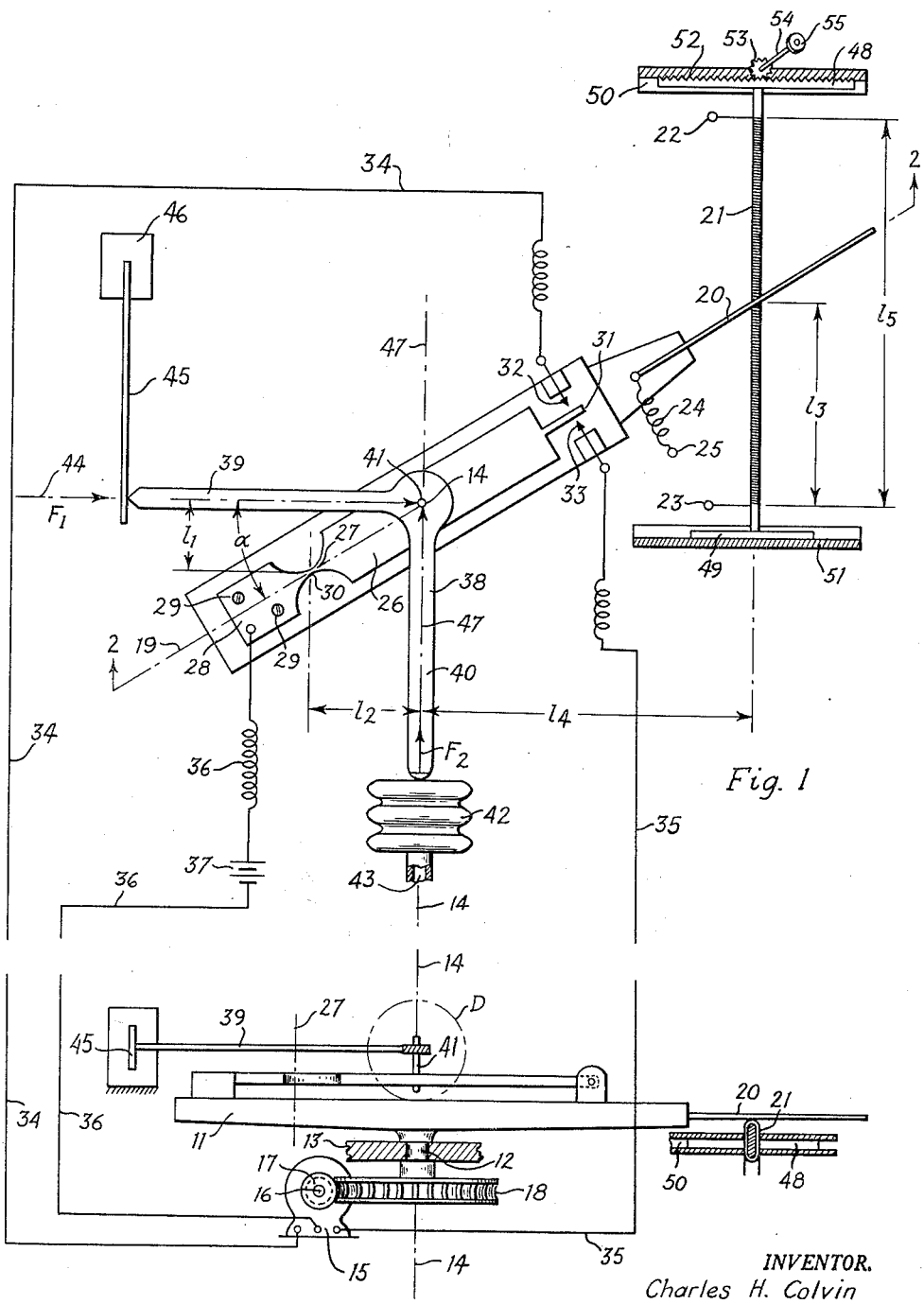

Filed March 21, 1958  5 Sheets-Sheet 2

INVENTOR.
Charles H. Colvin
BY Howard G. Russell
his ATTORNEY

June 12, 1962 C. H. COLVIN 3,038,339
PRESSURE TRANSDUCER
Filed March 21, 1958 5 Sheets-Sheet 3

INVENTOR.
Charles H. Colvin
BY Howard G. Russell
his ATTORNEY

June 12, 1962

C. H. COLVIN 3,038,339

PRESSURE TRANSDUCER

Filed March 21, 1958

INVENTOR.
Charles H. Colvin
BY
Howard G. Russell
his ATTORNEY

United States Patent Office 3,038,339
Patented June 12, 1962

3,038,339
PRESSURE TRANSDUCER
Charles H. Colvin, Morris Township, Morris County, N.J., assignor to Colvin Laboratories, Inc., East Orange, N.J., a corporation of New Jersey
Filed Mar. 21, 1958, Ser. No. 723,068
9 Claims. (Cl. 73—407)

This invention relates to improvements in devices, commonly called transducers, for translating values of a physical condition, for example pressure, or temperature expressed in terms of pressure, into an electrical signal, such as a voltage, for convenient transmittal of the electrical signal to a remote point, where it may actuate an indicator or control devices.

Pressure transducers are known in which basically a diaphragm capsule or bellows actuates a wiper arm sweeping over a potentiometer winding for the purpose of producing a signal voltage to represent the pressure acting on the capsule or bellows.

The present invention provides an improved instrument capable of translating pressure into values of tangent of an angle. This angle, or its tangent, may be locally indicated or transmitted to a remote location. Conveniently, the transducer may comprise a potentiometer winding so arranged that the pressure signal is translated into a signal of voltage ratio, for example in such a way that a maximum pressure is represented by a one-to-one ratio of two voltages. A pressure equal to one-half of the maximum pressure then produces two voltages in the ratio of one-to-two, and so forth.

The condition to be translated into an electrical signal, such as pressure, may be compared by the instrument with a standard pressure, for example a constant pressure, or in a broader sense a constant force in which event the signal represents the variable pressure in terms of percentage of the standard. However, the instrument may also compare two variable conditions, such as pressures, to produce a signal representing the ratio of the conditions.

The features and advantages of this invention will appear more fully from the detailed description which follows accompanied by drawings, for the purpose of illustration, of embodiments of the invention. The invention also resides in certain new and original features of construction and combination of elements hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it, in which:

FIGURE 1 is a diagrammatic representation, in plan view, of the principal elements of an apparatus incorporating the invention;

FIGURE 2 is an elevational view of the mechanism shown in FIGURE 1;

Figure 3:
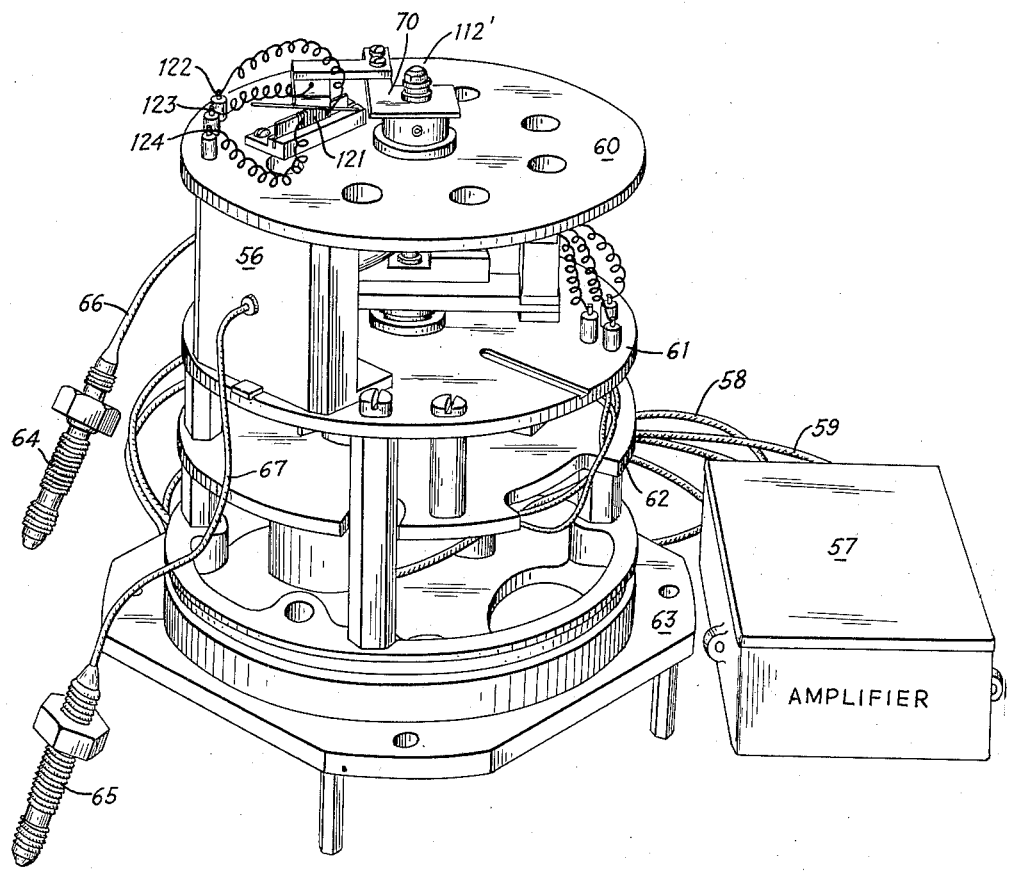
FIGURE 3 is a perspective view of an instrument incorporating the principles represented in FIGURES 1 and 2.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of the invention for the purpose of explanation of its broader aspects, but it is understood that the details may be modified in various respects without departure from the principles of the invention and that the invention may be embodied in other structures than shown.

The basic mechanical structure required for practicing the invention, its operation, and its applications or uses are best described by first referring to the diagrammatic FIGURES 1 and 2.

A driven rotatable member 11 has a shaft 12 mounted in a fixed support 13 for rotation about a vertical axis 14. A reversible servo-motor 15 having a shaft 16 is capable of rotating the member 11 through worm gears 17 and 18 in one direction or the opposite direction depending on the actuation of its controlling switching mechanism later to be described.

The driven rotatable member 11 has a longitudinal axis 19 passing through the vertical axis 14, and a wiper brush 20 extends in line with the axle 19 over a potentiometer winding 21. The winding is a straight line winding and has terminals 22 and 23. A flexible connection 24 extends from a terminal 25 to the wiper arm or brush 20.

A control arm 26 is pivotally mounted on the driven member 11 for movement about a pivot axis 27 spaced from and parallel to the rotation axis 14. In the diagrammatically illustrated mechanism the control arm 26 has an end portion 28 secured to the rotatable member 11 by screws 29 and is machined at 30 to produce a thin, practically friction free pivoting portion which permits pivotal movement of the arm 26 about the pivot axis 27. The control arm 26 carries a contact 31 which is movable between fixed contacts 32 and 33 on the rotatable member 11. Leads 34 and 35 extend from the contacts 32 and 33 to the motor 15, and a third connection 36 extends from the control arm to a source of electric power 37 and thence to the motor 15, the arrangement being such that upon closing of contacts 31, 33 the motor turns in one direction and upon closing of the contacts 31, 32 the motor turns in the opposite direction.

In FIGURE 1 the control arm 26 is shown in its neutral position in which the motor 15 is at rest. The control arm may be deflected from its rest position by a force to be translated into an electrical signal for transmission to a remote point.

For this purpose a two-armed lever 38 is provided having arms 39 and 40 extending at substantially right angles from an apex point 41 at which the lever 38 is pivotally mounted on the arm 26. The pivot point 14 normally coincides with the axis 14. A force $F_2$ applied in the direction of the arm 40 acts on the control arm 26 at a lever arm $l_2$ equal to the distance of the pivot axis 27 from the axis of symmetry 47 of the arm 40. This axis is shown to be vertical in FIGURE 1 for the purpose of explanation.

In the diagram the means for applying this force is represented as being a bellows or diaphragm capsule 42 to which a pressure line 43 leads. An increase in the pressure inside the capsule 42 tends to bring about a closing of the contacts 31, 32.

A further force $F_1$ acts on the control arm 26 in the opposite sense, in the direction of the arm 39 having an axis of symmetry 44 shown horizontal for the purpose of explanation. In the illustrated example the force is exerted by a flat spring 45 fixedly mounted at one end at 46. The force $F_1$ acts on the control arm at a lever arm $l_1$ equal to the distance of the axis 44 from the pivot axis 27 and tends to open the contacts 31, 32.

The force exerted by the spring 45 may be considered constant, as long as the arm 39 is not displaced in the direction 44.

Under condition of balance the spring force $F_1$ acting on the lever arm $l_1$ is equal to the force $F_2$ acting on the lever arm $l_2$. Since the spring force $F_1$ is constant (by reason of the fact that the arm 39 is neither moved towards, nor away from, the spring), the force exerted by the diaphragm capsule or, in other words, the pressure within the diaphragm capsule, is proportional to $l_1$ divided by $l_2$, this being the tangent of the angle $\alpha$ between the directional axes 19 and 44.

This angle is automatically adjusted in dependence on the changes in the pressure inside the diaphragm capsule 42. Assuming, for example, that the pressure inside the capsule 42 is increased, the contacts 31 and 32 are closed, starting the motor 15 which turns the rotatable member 11 in a counterclockwise direction until the contacts 31, 32 open. The orientation of the longitudinal axis 19 of the rotatable member 11 is thus adjusted by increasing the angle $\alpha$ and, as soon as the condition of balance is reached in which the contacts are broken, the tangent of the angle $\alpha$ is a measure of the pressure inside the capsule 42.

It should be noted that the increased force $F_2$ of the diaphragm 42 is not balanced by an increase in the force $F_1$ but by a decrease in the lever arm $l_2$ and an increase in the lever arm $l_1$, the force $F_1$ remaining constant because the distance of the spring from the apex point 41 remains the same for all angles $\alpha$.

The pressure prevailing in the pressure line 43 may be converted into a signal of voltage ratios by the potentiometer winding 21 which lies parallel to the line of force $F_2$ at a distance $l_4$. This distance may be fixed for a particular apparatus, but may also be adjustable. For the purpose of adjustment the potentiometer winding may be provided with end pieces 48, 49, slidable in tracks 50 and 51. The end piece 48 is provided with a rack portion 52 meshing with a pinion 53 on a shaft 54 which also carries a setting knob 55.

Two voltages are derived from the potentiometer in the illustrated arrangement. One voltage is measured between terminals 23 and 25 and corresponds to the length $l_3$, and a second voltage is measured between terminals 22 and 23 and corresponds to the length $l_5$.

In the position in which the potentiometer arm rests on the upper end of the winding $l_3$ becomes equal to $l_5$ and the voltage ratio is 1.0. This condition may represent the maximum pressure to be encountered in the operation of the instrument. The position illustrated in FIGURE 1 corresponds to a pressure represented by the voltage ratio 1 to 2. Thus any pressure less than the maximum pressure is represented by the voltage ratio $l_3$ divided by $l_5$, a signal proportional to prevailing pressure divided by maximum pressure.

If the device is adjusted to produce a one-to-one ratio of voltages at maximum pressure, any lesser prevailing pressure produces a signal of voltages in terms of percentage of the maximum condition.

The device is readily adjusted to produce a one-to-one ratio of voltages at maximum pressure by sliding the potentiometer winding 21 parallel to itself in tracks 50 and 51 until the wiper arm 20 contacts the upper end of the potentiometer winding at the condition of maximum pressure.

The same adjustment may also be considered as producing a large range of voltages for a relatively small range of pressures. If $l_4$ is increased, a smaller angular motion of the potentiometer arm 20 is required to sweep the potentiometer winding from end to end, and vice versa.

FIGURE 3 illustrates an instrument comprising basically a mechanical unit 56 and an amplifier 57 connected by cables 58, 59.

The mechanical unit comprises four mounting plates 60, 61, 62 and 63 on which the various components of the instruments are mounted. Two pressure fittings 64 and 65 on tubes 66 and 67 lead to diaphragms 68 and 69 best visible in FIGURE 4.

One of the diaphragms may be connected to a source of constant pressure, thus exerting a constant force equivalent to the force of the spring 45 in FIGURE 1 and the other diaphragm may be connected to a source of variable pressure, as in diaphragm chamber 42 in FIGURE 1. In such an arrangement the instrument produces a signal which is a function of tan $\alpha$ as a measure of the variable pressure acting on the said other diaphragm chamber.

However, both diaphragms 68 and 69 may be acted upon by variable pressures, in which event the instrument produces a signal which is a function of the ratio of the two pressures.

A shaft 112′ extends through the mounting plate 60 and carries an arm 70 to the end of which a brush 120 is mounted. The brush sweeps a potentiometer winding 121 when the shaft is being rotated. Binding posts 122 and 124 provide connections to the ends of the winding 121, and a further binding post 123 provides a connection for the brush 120.

Figure 4:
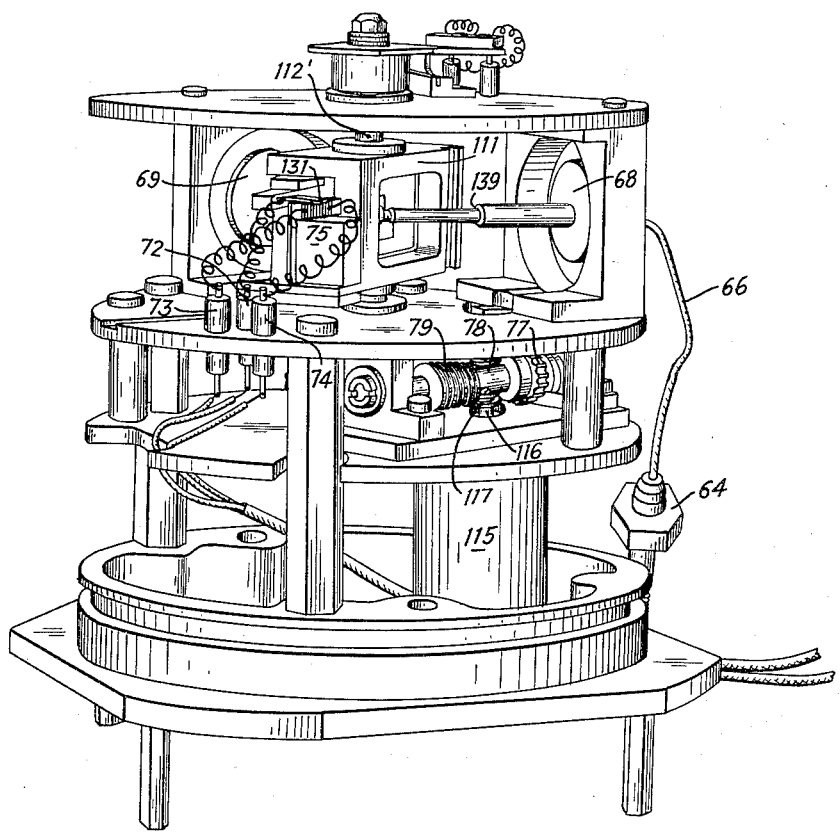
FIGURES 4 to 6 show the instrument of FIGURE 3 from different angles.
Figure 6:
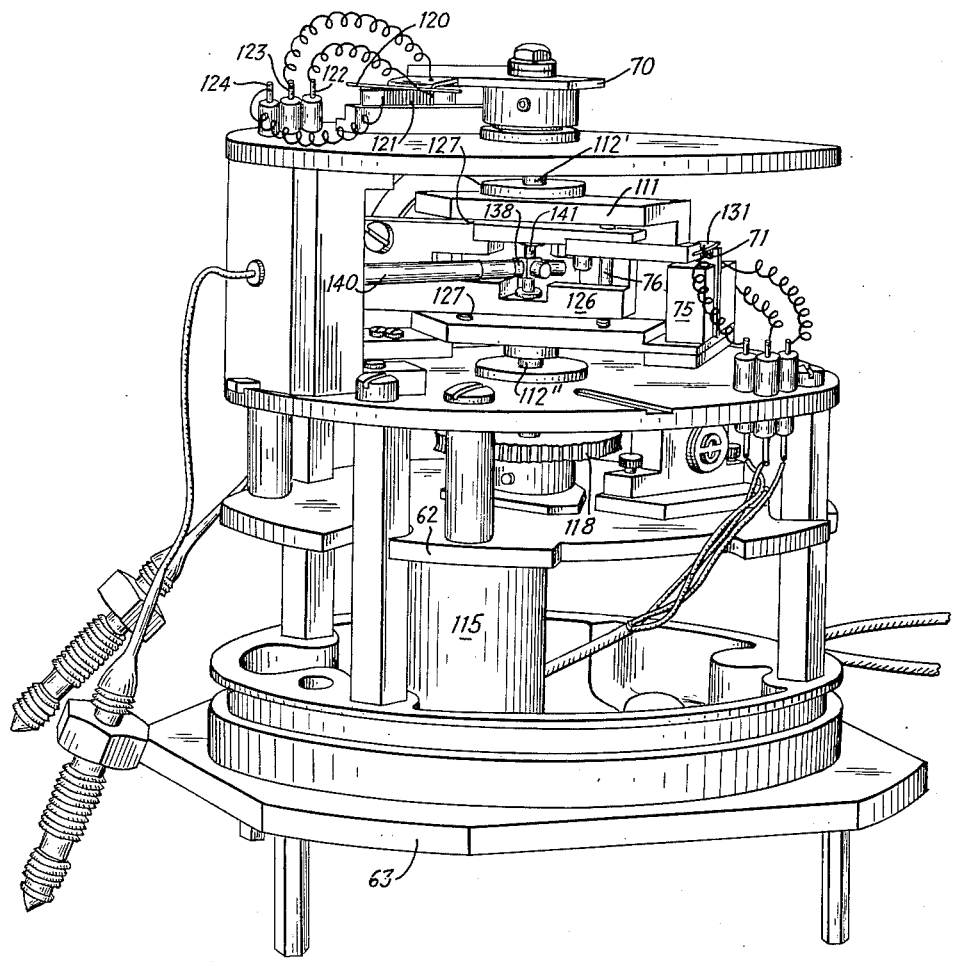

Referring now particularly to FIGURES 4 and 6 the shaft 112′ extends upwardly from a driven rotatable frame 111 from which a further shaft 112″ extends downwardly and carries a gear 118 on its end.

A control arm 126 is pivotally supported within the rotatable frame 111 about a pivot axis 127 which is horizontally spaced with respect to the axis of the shafts 112, 112′. The control arm 126 carries a contact arm 131 movable over a potentiometer winding 71 on the frame 111 proper. The potentiometer winding 71 comprises a first portion 132 to one side of the center and a second portion 133 to the other side of its central point. The contact arm moves onto one portion or the other when deflected from its central and neutral position as a result of a condition of unbalance.

A two-armed lever 138 is pivotally mounted on the control arm 126 at a pivot axis 141 and has two arms 139 (FIG. 5) and 140 (FIG. 6). Arm 139 is acted upon by the diaphragm 68 and arm 140 is acted upon by the diaphragm 69.

Figure 5:
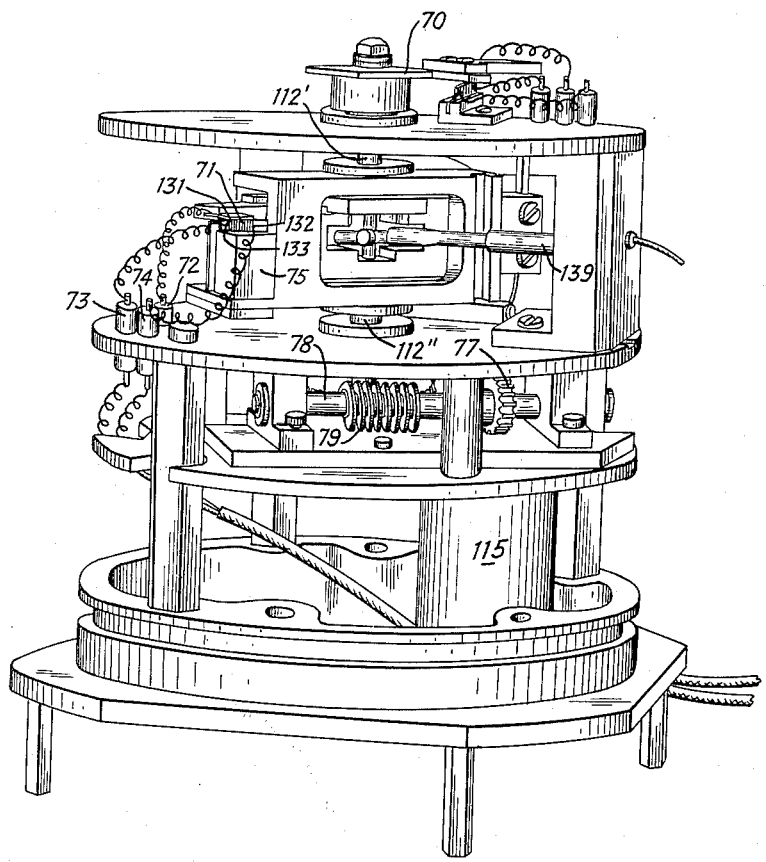

Three binding posts are visible in FIGURES 4, 5 and 6. A binding post 72 provides a connection for the movable contact arm 131 and binding posts 73 and 74 provide connections for the ends of the potentiometer winding 71 mounted on an insulating block 75 at the end of the rotatable frame 111.

A vertical pin 76 is visible in FIGURE 6. This pin is fixed in frame 111 and extends through enlarged apertures (not visible) in the control arm 126 to limit the maximum displacement of the control arm 126 with respect to the frame 111.

A reversible motor 115 is visible between the mounting plates 62 and 63. It carries on its shaft 116 a worm gear 117 which meshes with a gear 77 on a horizontal shaft 78 (FIG. 4). The shaft 78 is a speed reducing shaft and carries a further worm gear 79 meshing with the large gear 118 on the shaft 112″ which turns the frame 111.

The apparatus operates as follows:

If the pressure acting on one of the diaphragms 68 and 69 is increased or decreased the control arm 126 is displaced with respect to the frame 111. It pivots relatively to the frame 111 about the pivot axis 127 and the contact arm 131 moves onto one portion 132 of the potentiometer winding 71, or the other portion 133. The control potential of the arm 131 is impressed upon the amplifier 57 producing an amplified output fed into the motor 115. The motor turns in one direction or the other, causing rotary adjustment of the frame 111 until a condition of balance between the forces of the diaphragms 68 and 69 is re-established. At this moment the control arm 131 moves onto the neutral point of the potentiometer winding 71 and the motor stops.

The rotation of the frame 111 causes a corresponding angular displacement of the arm 70 on top of the instrument. The arm 70 carries the wiper brush 120 on the potentiometer winding 121. The voltage which may be derived between the binding posts 123 and 124 or between the binding posts 122 and 124 is a signal representing the ratio of the two pressures acting on the diaphragms 68 and 69.

Except for the specific form of the motor control, comprising an amplifier 57 and a potentiometer winding 71 in place of the control contacts 31, 32, 33 of FIGURE 1, the operation of the instrument of FIGURE 3 corresponds to the operation of the instrument of FIGURE 1.

The motor control of the instrument of FIGURE 3 offers the advantage of varying the motor speed in dependence on the magnitude of the displacement of the control arm 126 relatively to the frame 111. In the event of a large displacement the motor runs faster and its speed is gradually reduced as the condition of balance is being approached. This arrangement results in smooth control and great stability, and freedom from "hunting."

What is claimed is:

1. A pressure responsive instrument comprising, in combination, a driven member rotatable about a rotation axis; a control arm pivotally mounted on said driven member at a first pivot axis spaced from, and parallel to, said rotation axis, said control arm having a force application point substantially in line with said rotation axis; a pressure responsive movable wall including means for applying the force exerted by said wall to said control arm at its application point in a first direction at an angle with respect to the direction of said control arm, thereby tending to displace said control arm from its normal rest position with respect to said driven member; means for applying a restoring force to said control arm at its said application point in a second direction substantially at right angles to said first direction, thereby tending to restore said control arm towards its rest position; switch means actuated by the displacement of said control arm with respect to said driven member; power means controlled by said switch means for rotating said driven member in a direction to restore the control arm to its rest position in which the tangent of the angle between the control arm and said second direction becomes a measure of the pressure acting on said movable wall; a substantially straight-line potentiometer element; a pivotally mounted wiper sweeping over said element, the line extending through the wiper pivot and the point of contact of the wiper with the element representing a wiper center line; means connecting said wiper with said driven member for movement of the wiper relatively to said element in proportion to the angle of rotation of the driven member, said element being so disposed with respect to the wiper pivot that the angle between the wiper center line and said element is substantially equal to the angle between one of said directions and said control arm.

2. A pressure responsive instrument comprising, in combination, a driven member rotatable about a rotation axis; a control arm pivotally mounted on said driven member at a first pivot axis spaced from, and parallel to, said rotation axis, said control arm having a force application point substantially in line with said rotation axis; a pressure responsive movable wall including means for applying the force exerted by said wall to said control arm at its application point in a first direction at an angle with respect to the direction of said control arm, thereby tending to displace said control arm from its normal rest position with respect to said driven member; means for applying a restoring force to said control arm at its said application point in a second direction substantially at right angles to said first direction, thereby tending to restore said control arm towards its rest position; switch means actuated by the displacement of said control arm with respect to said driven member; power means controlled by said switch means for rotating said driven member in a direction to restore the control arm to its rest position; a substantially straight-line potentiometer winding; a pivotally mounted wiper sweeping over said winding, the line extending through the wiper pivot and the point of contact of the wiper with said winding representing a wiper center line; means connecting said wiper with said driven member for movement of said wiper relatively to said winding by said driven member, the winding being so disposed with respect to the wiper pivot that the angle between the wiper center line and said winding is substantially equal to the angle between one of said directions and said control arm.

3. A pressure responsive instrument comprising, in combination, a driven member rotatable about a rotation axis; a control arm pivotally mounted on said driven member at a first pivot axis spaced from, and parallel to, said rotation axis, said control arm having a force application point substantially in line with said rotation axis; a pressure responsive movable wall including means for applying the force exerted by said wall to said control arm at its application point in a first direction at an angle with respect to the direction of said control arm, thereby tending to displace said control arm from its normal rest position with respect to said driven member; means for applying a restoring force to said control arm at its said application point in a second direction substantially at right angles to said first direction, thereby tending to restore said control arm towards its rest position; switch means actuated by the displacement of said control arm with respect to said driven member; power means controlled by said switch means for rotating said driven member in a direction to restore the control arm to its rest position; a substantially straight-line potentiometer element mounted substantially parallel to said first direction and spaced from said rotation axis, and a wiper arm fixed on said driven member in such a position that the angle between the wiper center line and the straight line potentiometer element is equal to the angle between the control arm and one of the directions of force application, said wiper arm sweeping over said element.

4. A pressure responsive instrument comprising, in combination, a driven member rotatable about a rotation axis; a control arm pivotally mounted on said driven member at a first pivot axis spaced from, and parallel to, said rotation axis, said control arm having a force application point substantially in line with said rotation axis; a pressure responsive movable wall including means for applying the force exerted by said wall to said control arm at its application point in a first direction at an angle with respect to the direction of said control arm, thereby tending to displace said control arm from its normal rest position with respect to said driven member; means for applying a restoring force to said control arm at its said application point in a second direction substantially at right angles to said first direction, thereby tending to restore said control arm towards its rest position; switch means actuated by the displacement of said control arm with respect to said driven member; power means controlled by said switch means for rotating said driven member in a direction to restore the control arm to its rest position; a substantially straight-line potentiometer winding mounted substantially parallel to one of said directions and spaced from said rotation axis; a wiper arm actuated by said driven member, said wiper arm sweeping over said winding, and means for moving said winding parallel to itself towards, and away from, said rotation axis.

5. A pressure responsive instrument comprising, in combination, a driven member rotatable about a rotation axis; a control arm pivotally mounted on said driven member at a first pivot axis spaced from, and parallel to, said rotation axis, said control arm having a force application point substantially in line with said rotation axis; a pressure responsive movable wall including means for applying the force exerted by said wall to said control arm at its application point in a first direction at an angle with respect to the direction of said control arm, thereby tending to displace said control arm from its normal rest position with respect to said driven member; a spring for applying a restoring force to said control arm at its said application point in a second direction substantially at right angles to said first direction, thereby tending to restore said control arm towards its rest position; switch means actuated by the displacement of said control arm with respect to said driven member; power means controlled by said switch means for rotating said driven member in a direction to restore the control arm to its rest position; a substantially straight-line potentiometer winding mounted substantially parallel to one of said directions and spaced from said rotation axis; a wiper arm actuated by said driven member, said wiper arm sweeping over said winding, and means for moving said winding parallel to itself towards, and away from, said rotation axis.

6. A pressure responsive instrument comprising, in combination, a driven member rotatable about a rotation axis; a control arm pivotally mounted on said driven member at a first pivot axis spaced from, and parallel to, said rotation axis, said control arm having a force application axis substantially in line with said rotation axis; a two-armed lever whose arms extend from an apex point and are substantially right-angularly disposed with respect to each other, said lever being pivotally mounted on said control arm at its force application axis; a pressure responsive movable wall acting on one of said lever arms in the direction toward said apex point, thereby tending to displace said control arm from its normal rest position with respect to said driven member; spring means acting on the other lever arm in the direction toward said apex point; switch means actuated by the displacement of said control arm with respect to said driven member; power means controlled by said switch means for rotating said driven member in a direction to restore the control arm to its rest position in which the tangent of the angle between the control arm and said second direction becomes a measure of the pressure acting on said movable wall; a substantially straight-line potentiomter element; a pivotally mounted wiper sweeping over said element, the line extending through the wiper pivot and the point of contact of the wiper with the element representing a wiper center line; means connecting said wiper with said driven member for movement of the wiper relatively to said element in proportion to the angle of rotation of the driven member, said element being so disposed with respect to the wiper pivot that the angle between the wiper center line and said element is substantially equal to the angle between one of said directions and said control arm.

7. A pressure responsive instrument comprising, in combination, a driven member rotatable about a rotation axis; a control arm pivotally mounted on said driven member at a first pivot axis spaced from, and parallel to, said rotation axis, said control arm having a force application axis substantially in line with said rotation axis; a two-armed lever whose arms extend from an apex point and are substantially right-angularly disposed with respect to each other, said lever beig pivotally mounted on said control arm at its force application axis; a pressure responsive movable wall acting on one of said lever arms in the direction toward said apex point, thereby tending to displace said control arm from its normal rest position with respect to said driven member; spring means acting on the other lever arm in the direction toward said apex point; switch means actuated by the displacement of said control arm with respect to said driven member; power means controlled by said switch means for rotating said driven member in a direction to restore said control arm to its rest position; a substantially straight-line potentiometer element; a pivotally mounted wiper sweeping over said element, the line extending through the wiper pivot and the point of contact of the wiper with said element representing a wiper center line, said wiper being fixed on said driven member in such a position that the angle between the wiper center line and the straight line potentiometer element is equal to the angle between the control arm and one of the directions of force application.

8. A pressure responsive instrument comprising, in combination, a driven member rotatable about a rotation axis; a control arm pivotally mounted on said driven member at a first pivot axis spaced from, and parallel to, said rotation axis, said control arm having a force application axis substantially in line with said rotation axis; a two armed lever whose arms extend from an apex point and are substantially right-angularly disposed with respect to each other, said lever being pivotally mounted on said control arm at its force application axis; a pressure responsive movable wall acting on one of said lever arms in the direction toward said apex point, thereby tending to displace said control arm from its normal rest position with respect to said driven member; spring means acting on the other lever arm in the direction toward said apex point; switch means actuated by the displacement of said control arm with respect to said driven member; power means controlled by said switch means for rotating said driven member in a direction to restore said control arm to its rest position; a substantially straight-line potentiometer element mounted substantially parallel to one of said lever arms and spaced from said rotation axis; and a wiper arm fixed on said driven member in such a position that the angle between the wiper center line and the straight line potentiometer element is equal to the angle between the control arm and one of the directions of force application, said wiper arm sweeping over said element.

9. A pressure responsive instrument comprising, in combination, a driven member rotatable about a rotation axis; a control arm pivotally mounted on said driven member at a first pivot axis spaced from, and parallel to, said rotation axis, said control arm having a force application axis substantially in line with said rotation axis; a two armed lever whose arms extend from an apex point and are substantially right-angularly disposed with respect to each other, said lever being pivotally mounted on said control arm at its force application axis; a pressure responsive movable wall acting on one of said lever arms in the direction toward said apex point, thereby tending to displace said control arm from its normal rest position with respect to said driven member; spring means acting on the other lever arm in the direction toward said apex point; switch means actuated by the displacement of said control arm with respect to said driven member; power means controlled by said switch means for rotating said driven member in a direction to restore said control arm to its rest position; a substantially straight-line potentiometer winding mounted substantially parallel to said one lever arm and spaced from said rotation axis; a wiper arm on said driven member, said wiper arm sweeping over said winding; and means for moving said winding parallel to itself towards, and away from, said rotation axis.

References Cited in the file of this patent

UNITED STATES PATENTS

| 2,388,559 | Macintyre | Nov. 6, 1945 |
| 2,597,831 | Willis | May 20, 1952 |
| 2,758,474 | McKinney | Aug. 14, 1956 |
| 2,798,191 | Brailsford | July 2, 1957 |
| 2,989,868 | Rosenberger | June 27, 1961 |

OTHER REFERENCES

An article entitled "Transducer and Servo System Generate Ratio of Pressures," in Design News, November 15, 1956 (pages 30 and 31).